C. G. LAYTON.
TRAP.
APPLICATION FILED MAY 25, 1917.

1,257,254.

Patented Feb. 19, 1918.

WITNESSES
G. E. Logan Jr.
J. W. Garner

INVENTOR
C. G. Layton

BY Victor J. Evans
ATTORNEY

UNITED STATES PATENT OFFICE.

CHURCHILL G. LAYTON, OF ALBANY, OREGON.

TRAP.

1,257,254.  Specification of Letters Patent.  Patented Feb. 19, 1918.

Application filed May 25, 1917. Serial No. 171,007.

*To all whom it may concern:*

Be it known that I, CHURCHILL G. LAYTON, a citizen of the United States, residing at Albany, in the county of Linn and State of Oregon, have invented new and useful Improvements in Traps, of which the following is a specification.

This invention relates to improvements in traps especially adapted for catching gophers, badgers and other burrowing animals, the object of the invention being to provide an improved trap which is particularly adapted to be placed on the hole or burrow of an animal and which is operable to catch the animal as it attempts to enter or leave the hole, a further object being to provide an improved trap of this character which is simple in construction, is strong and durable, and is not likely to get out of order.

The invention consists in the construction, combination and arrangement of devices hereinafter described and claimed.

In the accompanying drawings:—

Figure 1:
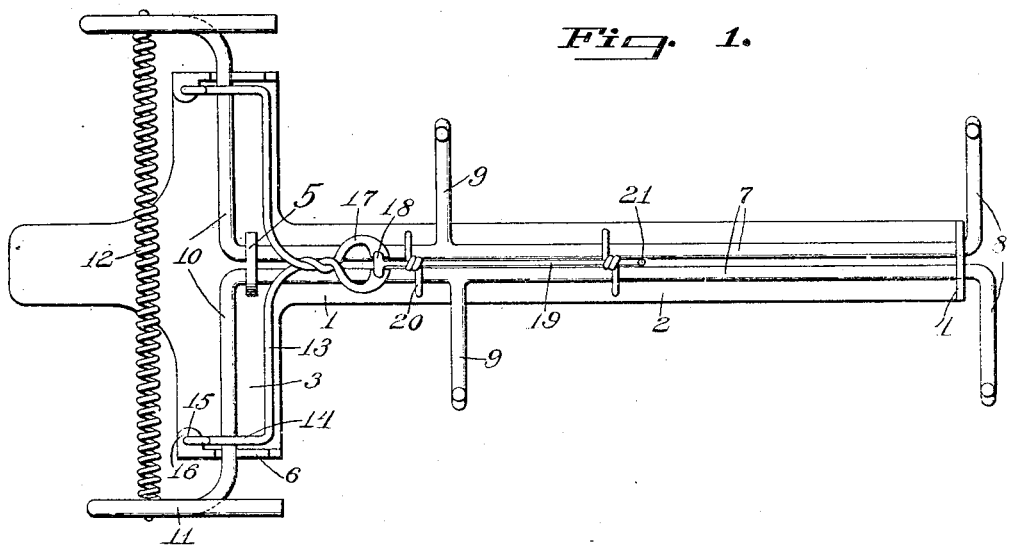
Figure 1 is a plan of my improved trap, showing the same set.
Figure 2:
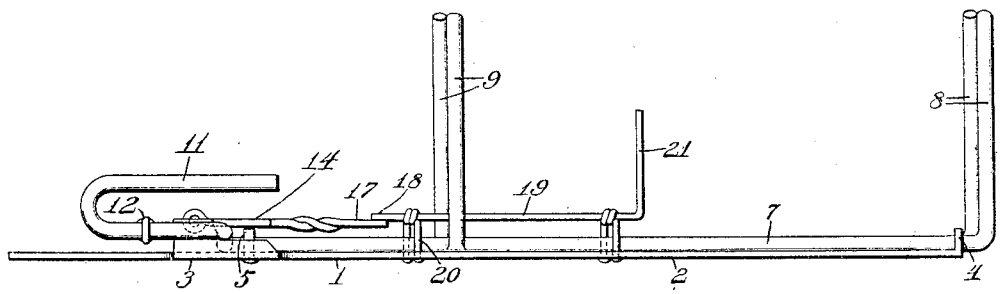
Fig. 2 is a side elevation.
Figure 3:
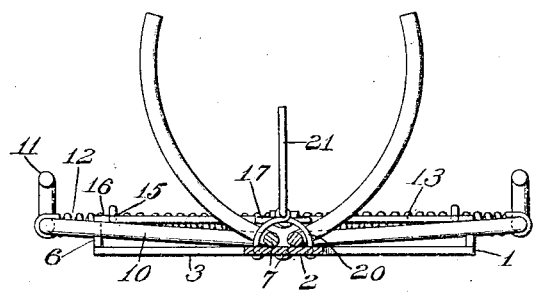
Fig. 3 is a transverse sectional view of the same.

In the embodiment of my invention I provide a base 1 which is preferably made of sheet metal but may be made of any suitable material and which comprises an arm 2 and a cross head or broadened portion 3 at the upper end of the arm. The base is provided with bearings 4, 5 which are respectively at the lower end and near the upper end of the arm. The cross head is provided at its ends with flanges or walls 6.

A pair of longitudinally arranged shafts 7 are mounted in the bearings 4, 5 and are provided at their lower ends with oppositely curved jaws 8 and are also provided at points a suitable distance from their upper ends with similar jaws 9. Said shafts have oppositely extending arms 10 at their upper ends which terminate in reversely turned portions which form handles 11 and the said handles are connected by a coiled retractile spring 12 which serves to turn the shaft in such manner as to cause their jaws to move toward each other and thereby close on opposite sides of an animal and securely hold the animal.

A substantially Y-shaped detent 13 is also provided which has arms 14 pivotally connected as at 15 to standards 16 which project from the front side of the cross head and are arranged near the ends thereof. The detent also has a pair of oppositely arranged arms 17 at its free end, which are spaced apart at their outer ends. When the trap is set with the jaws 8, 9 open and the arms 14 of the detent extending across and bearing on the arms 10 of the shafts 7 the arms 17 of the detent are engaged by the cross head 18 of a trigger rod 19. Said trigger rod is mounted for longitudinal movement in a pair of standards 20 with which the arm 2 of the base is provided and at the outer or lower end of the trigger rod is an outwardly turned arm 21.

The trap is placed in the burrow or opening, with the cross head 3 bearing on the ground on opposite sides of the burrow. The animal in attempting to enter or leave the burrow moves the trigger rod endwise, a slight distance, becoming in contact with the arm 21 thus causing the cross head 18 of the trigger rod to move from and release the arm 17 of the detent, whereupon the spring 12 serves to partly turn the shaft 7 in reverse directions and thereby close the jaws and cause two of the jaws to grip the animal from opposite sides, the arms 10 of the shaft moving the detent out of the way, as will be understood.

While I have herein shown and described a preferred form of my invention I would have it understood that changes may be made in the form, proportion and construction of the several parts, without departing from the spirit of my invention and within the scope of the appended claim.

Having thus described my invention, I claim:—

A trap comprising a base having an arm and a cross head at one end of the arm, said cross-head having flanges at its ends arranged at an angle thereto, a pair of rock shafts mounted in bearings on the arm and arranged out of line with the outer edges of said flanges, said rock shafts having jaws and also having, at their upper ends, oppositely extending arms which bear on said flanges when the jaws are open and are arranged at an angle with respect to each other, a coiled retractile spring connecting said arms, a detent pivotally mounted on the said flanges and arranged across and caused to bear on said arms when the trap is set, and a longitudinally movable trigger rod mounted on the base and having a cross head to bear on the detent to hold the latter in set position and prevent the trigger rod from casually turning, said rod having an arm.

In testimony whereof I affix my signature.

CHURCHILL G. LAYTON.

Copies of this patent may be obtained for five cents each, by addressing the "Commissioner of Patents, Washington, D. C."